United States Patent
Kwak et al.

(10) Patent No.: US 11,147,051 B2
(45) Date of Patent: Oct. 12, 2021

(54) TRANSMISSION OF GROUP COMMON PDCCH (PHYSICAL DOWNLINK CONTROL CHANNEL) FOR NR (NEW RADIO)

(71) Applicant: Apple Inc., Cupertino, CA (US)

(72) Inventors: Yongjun Kwak, Portland, OR (US); Gang Xiong, Portland, OR (US); Hwan-Joon Kwon, Portland, OR (US); Hong He, Sunnyvale, CA (US); Seung Hee Han, San Jose, CA (US); Debdeep Chatterjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 16/464,814

(22) PCT Filed: Feb. 5, 2018

(86) PCT No.: PCT/US2018/016889
§ 371 (c)(1),
(2) Date: May 29, 2019

(87) PCT Pub. No.: WO2018/145019
PCT Pub. Date: Aug. 9, 2018

(65) Prior Publication Data
US 2019/0349904 A1 Nov. 14, 2019

Related U.S. Application Data

(60) Provisional application No. 62/455,415, filed on Feb. 6, 2017, provisional application No. 62/502,519, filed on May 5, 2017.

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04L 25/0238* (2013.01); *H04L 69/324* (2013.01)

(58) Field of Classification Search
CPC ............... H04W 72/042; H04L 5/0048; H04L 25/0238; H04L 69/324; H04L 5/0094; H04L 5/003; H04L 5/0053
See application file for complete search history.

(56) References Cited

U.S. PATENT DOCUMENTS

2005/0163075 A1\* 7/2005 Malladi ................ H04B 7/2637 370/329
2014/0362701 A1\* 12/2014 Roh ...................... H04L 1/0071 370/235
(Continued)

OTHER PUBLICATIONS

Samsung, "Signaling of Slot Structure", Oct. 10-14, 2016, 3GPP (Year: 2016).\*
(Continued)

*Primary Examiner* — Peter P Chau
(74) *Attorney, Agent, or Firm* — Eschweiler & Potashnik, LLC

(57) ABSTRACT

Techniques discussed herein can facilitate transmission and reception of group common PDCCH (Physical Downlink Control Channel) for NR (New Radio). One example embodiment employable by a UE (User Equipment) comprises processing circuitry configured to: process higher layer signaling that configures a set of combinations for slot formats for the UE; detect, via blind decoding on at least a portion of a control resource set, a DCI (Downlink Control Information) message that indicates a combination for slot formats of the set of combinations for slot formats via a SFI (slot format indicator); and determine a slot format for one or more slots based on the indicated combination for slot formats, wherein the slot format indicates, for each symbol (Continued)

of the one or more slots, whether that symbol is DL (Downlink), UL (Uplink), or a flexible symbol in the slot format.

34 Claims, 11 Drawing Sheets

(51) Int. Cl.
*H04L 25/02* (2006.01)
*H04L 29/08* (2006.01)

(56) References Cited

U.S. PATENT DOCUMENTS

| | | | |
|---|---|---|---|
| 2018/0206226 A1* | 7/2018 | Zeng | H04W 72/0446 |
| 2019/0319686 A1* | 10/2019 | Chen, IV et al. | H04W 72/046 |
| 2019/0349795 A1* | 11/2019 | Park | H04W 72/1289 |
| 2020/0021419 A1* | 1/2020 | Taherzadeh Boroujeni | H04L 5/0091 |
| 2020/0059345 A1* | 2/2020 | Pelletier | H04L 1/1657 |
| 2020/0187236 A1* | 6/2020 | Moon | H04L 5/0044 |

OTHER PUBLICATIONS

Samsung, "Signaling of Slot Structure", Nov. 14-18, 2016, 3GPP (Year: 2016).*
International Search Report and Written Opinion dated Jul. 11, 2018 for PCT Application PCT/US/2018/016889.
"Control channel for slot format indicator." Agenda Item: 7.1.4.1. Source: Qualcomm Incorporated. 3GPP TSG-RAN WG1 #87 Nov. 14-18, 2016 Reno, Nevada, USA. R1-1612062, 2 pages.
"Summary of e-mail discussions on downiink control signaling." Agenda Item: 7.1.4.1. Source: Ericsson. TSG-RAN WG1 #87 Reno, NV, USA, Nov. 14-18, 2016. R1-1612908. 38 pages.
"Summary of offline discussion on group common PDCCH—part 2." Agenda Item: 5.1.3.1. Source: Ericsson. TSG-RAN WG1 NR AdHoc Spokane, WA, USA, Jan. 16-20, 2017. R1-1701521. 1 page.
"Outcome of offline discussion on downlink control signaling." Agenda Item: 5.1.3.1. Source: Ericsson. TSG-RAN WG1 NR AdHoc Spokane, WA, USA, Jan. 16-20, 2017. R1-1701334. 1 page.
"On 'PCFICH-like' Channels." Agenda Item: 5,1.3.1. Source: Ericsson. 3GPP TSG-RAN WG1 Ad hoc_NR Meeting Spokane, USA, Jan. 16-20, 2017, R1-1701121. 3 pages.
International Preliminary Report on Patentability dated Aug. 16, 2019 for PCT Application PCT/US/2018/016889.

* cited by examiner

TRANSMISSION OF GROUP COMMON PDCCH (PHYSICAL DOWNLINK CONTROL CHANNEL) FOR NR (NEW RADIO)

REFERENCE TO RELATED APPLICATIONS

This application is a National Phase entry application of International Patent Application No. PCT/US2018/016889 filed Feb. 5, 2018, which claims priority to U.S. Provisional Applications 62/502,519 filed May 5, 2017, entitled "TRANSMISSION OF GROUP COMMON PHYSICAL DOWNLINK CONTROL CHANNEL (PDCCH) FOR NEW RADIO (NR)" and 62/455,415 filed Feb. 6, 2017, entitled "TRANSMISSION OF GROUP COMMON PDCCH FOR NR", and is hereby incorporated by reference in their entirety.

FIELD

The present disclosure relates to wireless technology, and more specifically to techniques employable in connection with transmission of group common PDCCH (Physical Downlink Control Channel) for NR (New Radio).

BACKGROUND

Mobile communication has evolved significantly from early voice systems to today's highly sophisticated integrated communication platform. The next generation wireless communication system, 5G (Fifth Generation), or new radio (NR), will provide access to information and sharing of data anywhere, anytime by various users and applications. NR is expected to be a unified network/system that can meet vastly different and sometimes conflicting performance dimensions and services. These diverse multi-dimensional targets for NR are driven by different services and applications. In general, NR will evolve based on 3GPP (Third Generation Partnership Project) LTE (Long Term Evolution)-Advanced with additional potential new Radio Access Technologies (RATs) to enrich peoples' lives with better, simpler and seamless wireless connectivity solutions. NR will enable everything connected by wireless and deliver fast, rich contents and services.

DETAILED DESCRIPTION

Figure 1:
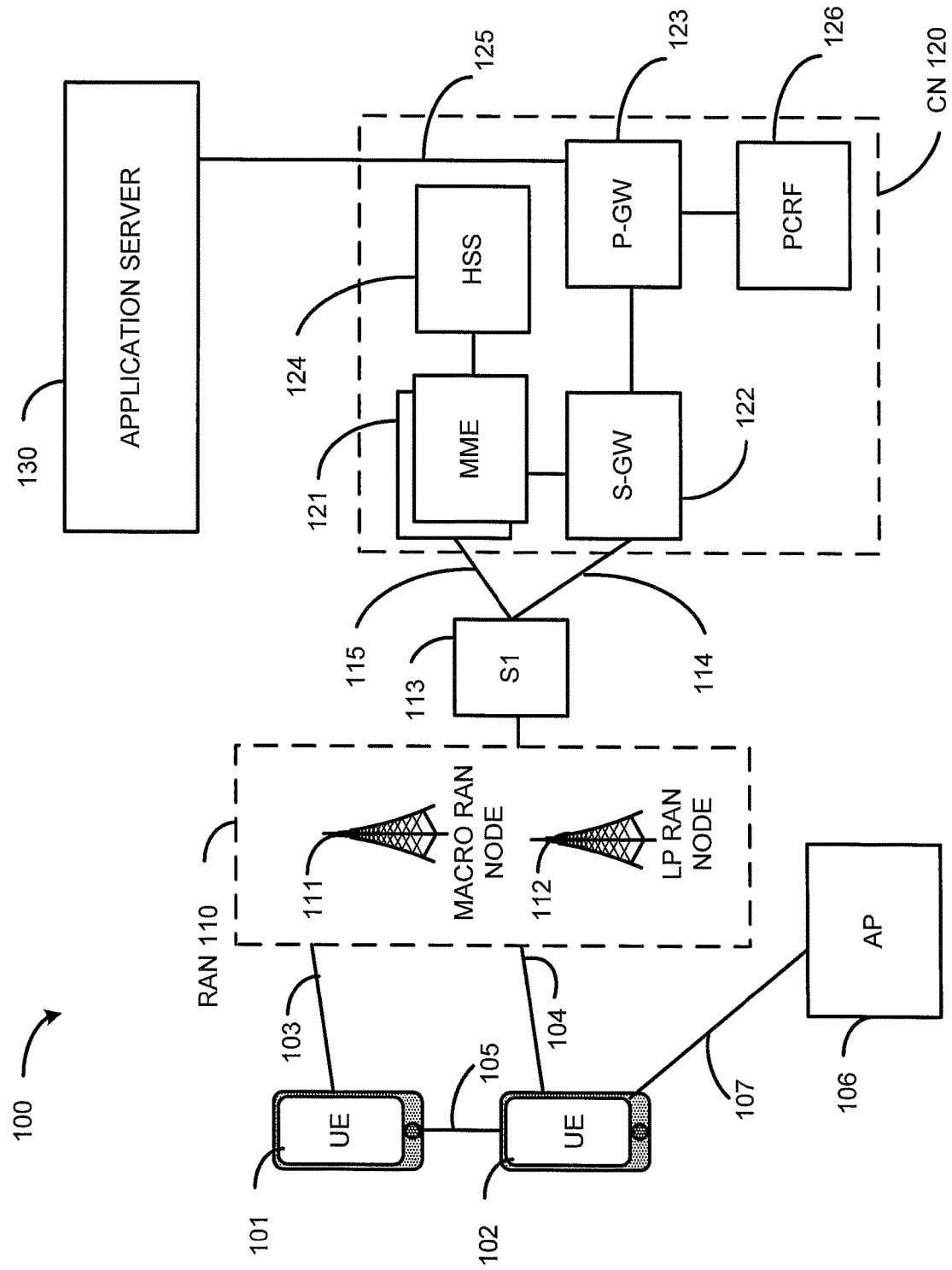
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
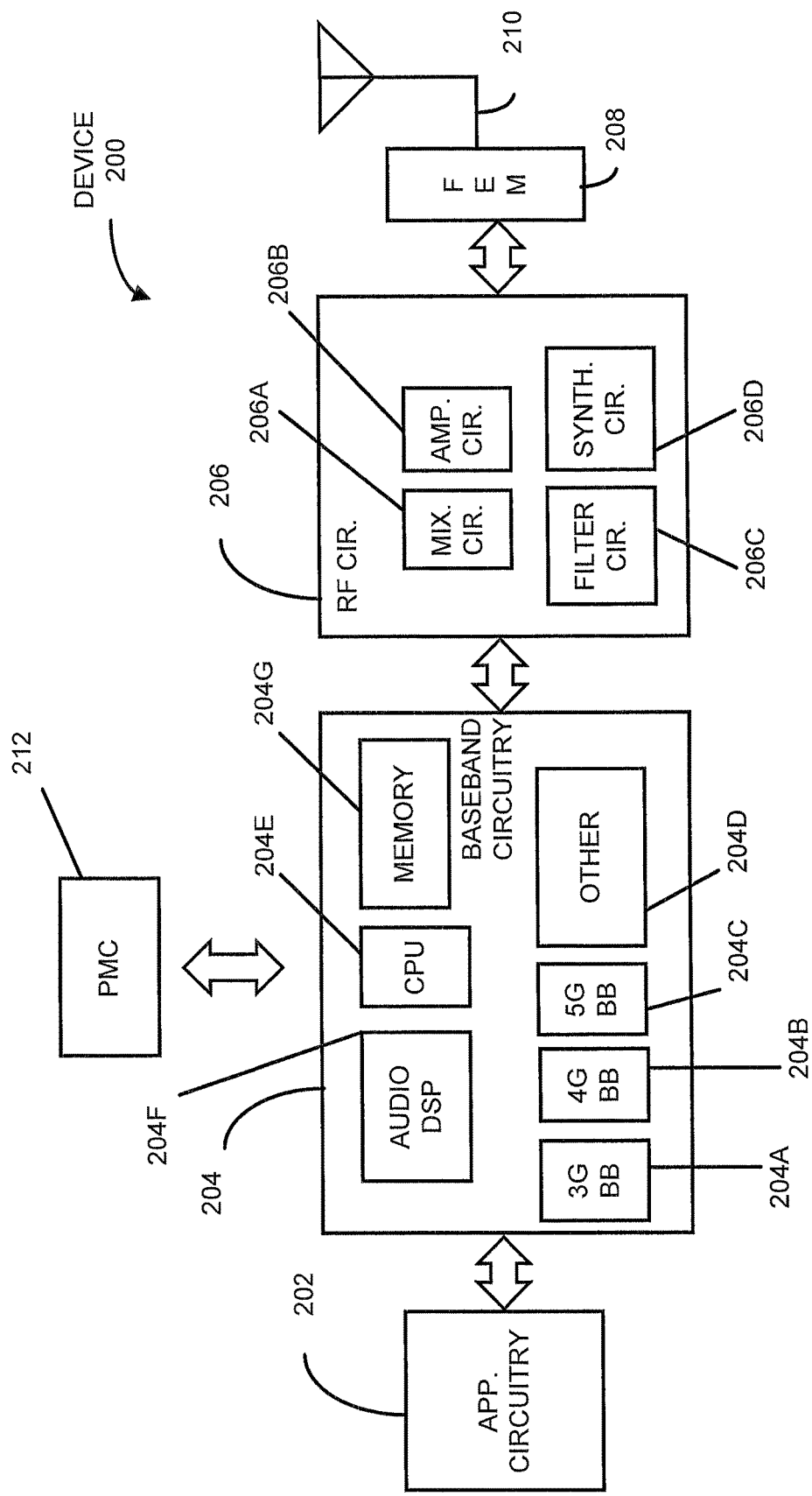
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
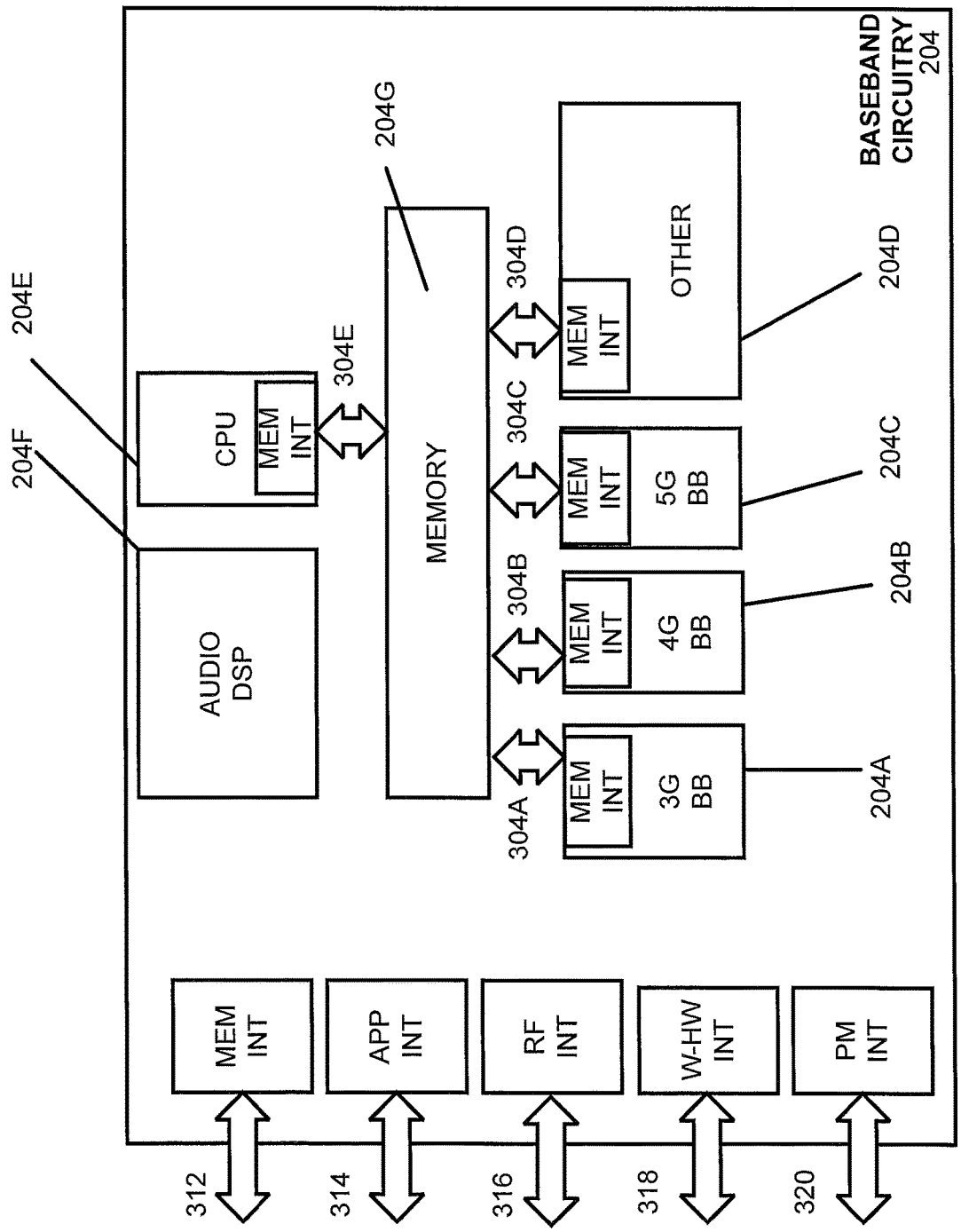
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
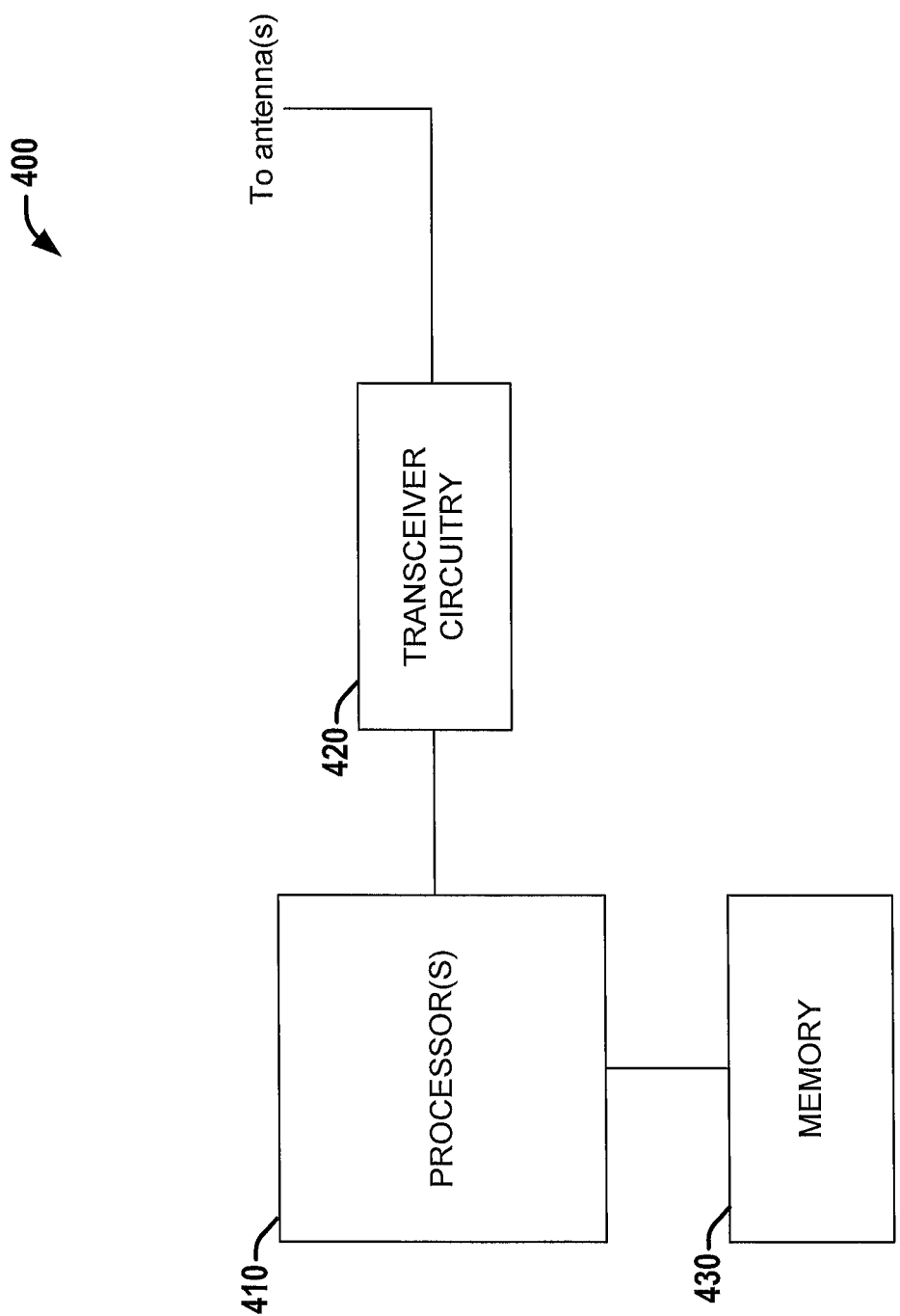
FIG. 4 is a block diagram illustrating a system employable at a UE (User Equipment) that facilitates reception of NR (New Radio) group common PDCCH (Physical Downlink Control Channel), according to various aspects described herein.

Referring to FIG. 4, illustrated is a block diagram of a system 400 employable at a UE (User Equipment) that facilitates reception of NR (New Radio) group common PDCCH (Physical Downlink Control Channel), according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate reception of higher layer signaling configuring group common PDCCH and/or potential slot formats, and reception of group common PDCCH indicating a slot format (e.g., based on the potential slot formats).

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
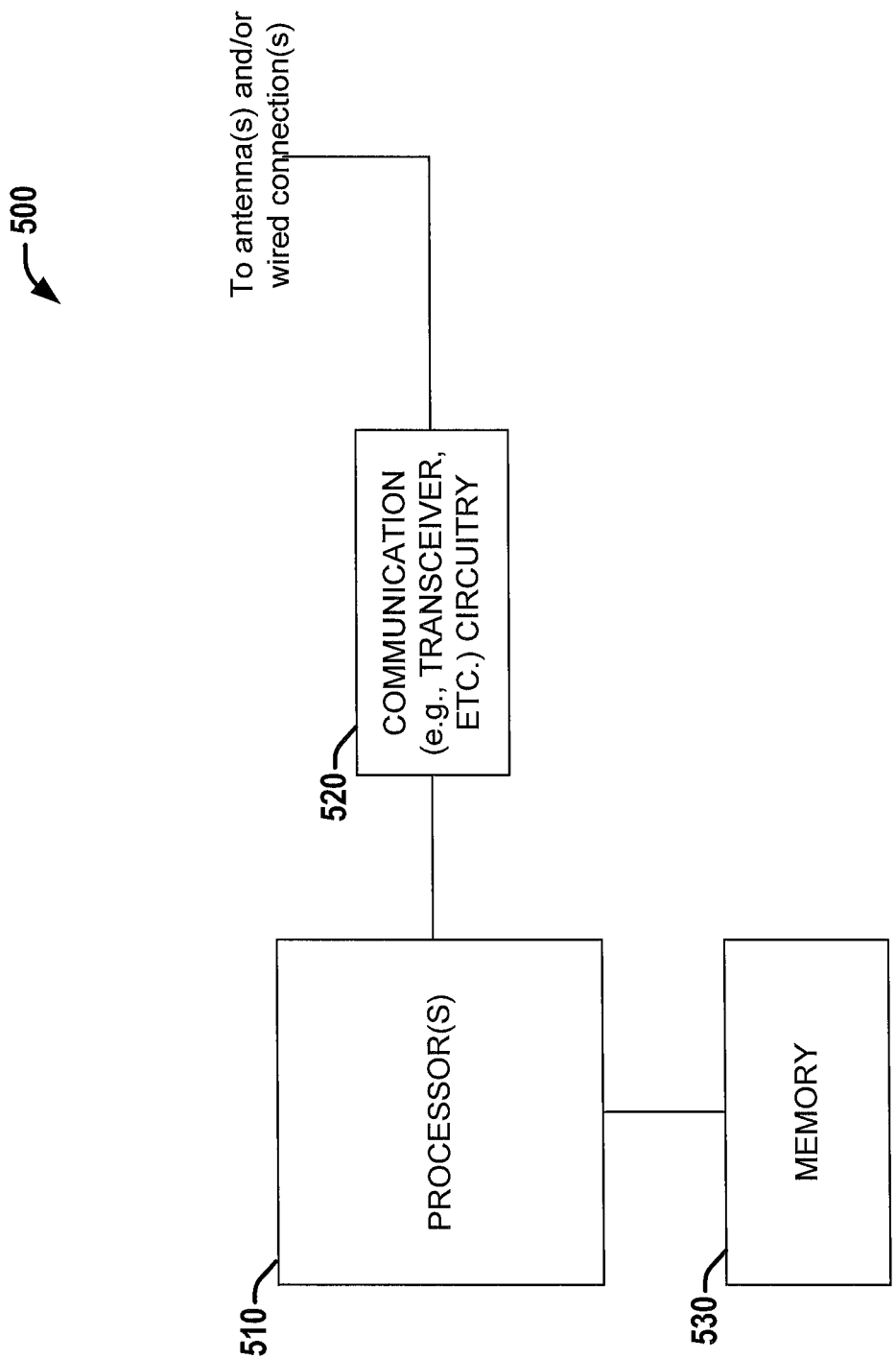
FIG. 5 is a block diagram illustrating a system employable at a BS (Base Station) that facilitates transmission of NR group common PDCCH, according to various aspects described herein.

Referring to FIG. 5, illustrated is a block diagram of a system 500 employable at a BS (Base Station) that facilitates transmission of NR group common PDCCH, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate transmission of higher layer signaling configuring group common PDCCH and/or potential slot formats, and reception of group common PDCCH indicating a slot format (e.g., based on the potential slot formats).

At the RAN1 (RAN (Radio Access Network) WG1 (Working Group 1)) NR (New Radio) Ad Hoc meeting, the following agreements were made with regard to the DL (Downlink) common control channel:

NR supports a 'group common PDCCH' carrying information of e.g. the slot structure 'Slot format related information'

Information from which the UE can derive at least which symbols in a slot that are 'DL', 'UL' (for Rel-15), and 'other', respectively As discussed above, group common PDCCH (e.g., generated by processor(s) 510) is supported for NR and can be transmitted (e.g., by communication circuitry 520) for a group of UEs, for example, where the group can be all UEs in a cell. In various aspects, group common PDCCH (e.g., generated by processor(s) 510) transmitted (e.g., via communication circuitry 520) can comprise a DCI (Downlink Control Information) message that indicates at least the slot format related information, from which the UE can derive (e.g., via processor(s) 410) at least which symbols in a slot are DL, UL, or other symbols, wherein the other symbols can be flexible symbols that can be employed (e.g., by system 400 and/or system 500) as, for example, blank resources, sidelink resources, etc. In various aspects, slot formats for each serving cell of a UE can be configured (e.g., separately, or in combinations of two or more, etc.).

Mechanisms to Minimize the Signaling Overhead for Group Common PDCCH

As explained herein, NR (New Radio) can support group common PDCCH (e.g., generated by processor(s) 510) that can be transmitted (e.g., via communication circuitry 520) for a set of UEs in a cell. The group common PDCCH (e.g., generated by processor(s) 510, transmitted via communication circuitry 520, received via transceiver circuitry 420, and processed by processor(s) 410) can indicate at least slot format related information, from which the UE can derive (e.g., via processor(s) 410) at least which symbols in a slot are DL, UL, or other symbols, wherein the other symbol can be flexible symbols that can be employed (e.g., by system 400 and/or system 500) as, for example, blank resources, sidelink resources, etc.

Figure 6:
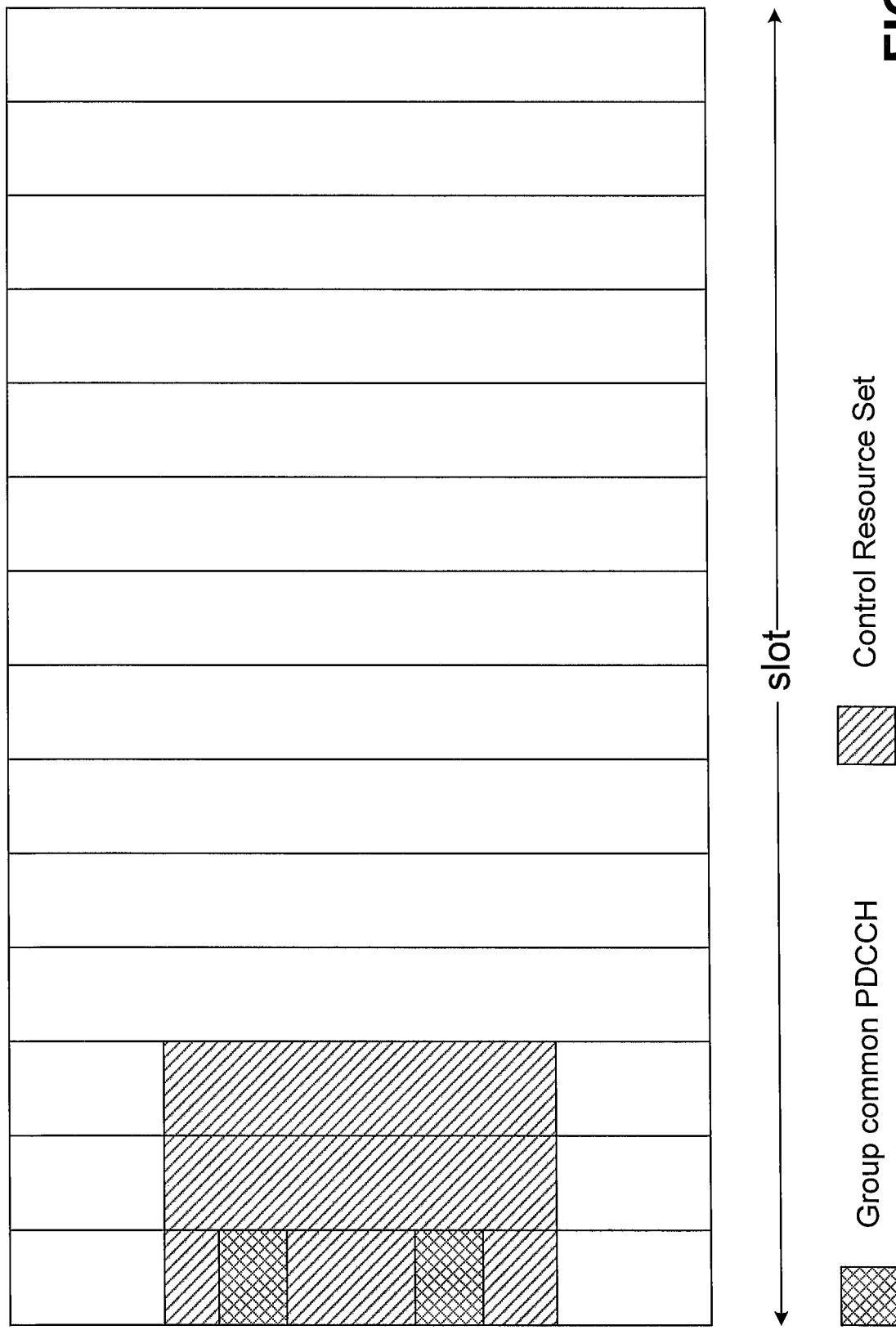
FIG. 6 is a diagram illustrating an example resource allocation for group common PDCCH for NR, according to various aspects discussed herein.

Referring to FIG. 6, illustrated is a diagram showing an example resource allocation for group common PDCCH for NR, according to various aspects discussed herein. In various aspects, a control resource set can be configured (e.g., via higher layer signaling generated by processor(s) 510, transmitted via communication circuitry 520, received via transceiver circuitry 420, and processed by processor(s) 410) in indicated time and frequency resources, for example as shown via the region with diagonal hatching in FIG. 6. Inside the control recourse set, the group common PDCCH (e.g., generated by processor(s) 510) can be transmitted (e.g., via communication circuitry 520), for example as shown via the region with cross hatching in FIG. 6.

Figure 7:
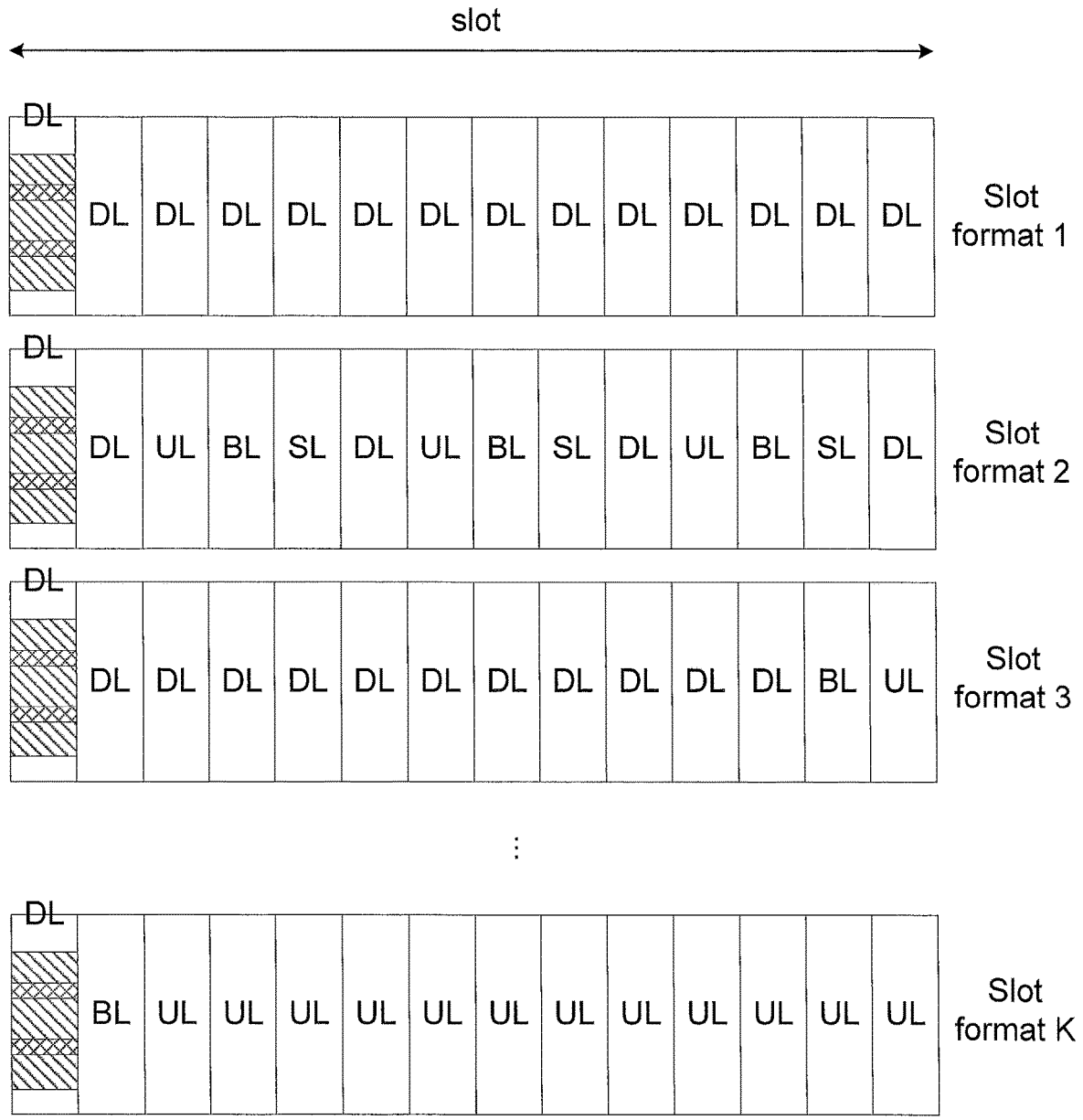
FIG. 7 is a diagram illustrating example combinations for slot formats where each symbol can be one of DL, UL, BL, or SL via explicit indication in group common PDCCH, for dynamic reuse of the control resource for data transmission, according to various aspects discussed herein.

In various aspects, for defining slot format related information, the most flexible technique can be to explicitly indicate the transmission direction, as one of four (e.g., DL, UL, BL (Blank), or SL (Sidelink)) or three (e.g., DL, UL, or other (which can be employed as a flexible symbol for options such as SL or BL)) options, for each symbol in a NR slot. Referring to FIG. 7, illustrated is a diagram showing example combinations for slot formats where each symbol can be one of DL, UL, BL, or SL via explicit indication in group common PDCCH, according to various aspects discussed herein. In such aspects, there can be K possible slot formats. In an example such as shown in FIG. 7 wherein each symbol can be one of the 4 possible transmission directions (DL, UL, BL, or SL) and a slot consists of 14 symbols (e.g., OFDM (Orthogonal Frequency Division Multiplexing) symbols or OFDM-based symbols) wherein the first symbol can be DL for transmission of PDCCH, then K can be up to $4^{13}$, and 26 bits can be employed to indicate one slot format out of the $4^{13}$ possible formats in group common PDCCH (e.g., generated by processor(s) 510, transmitted via communication circuitry 520, received via transceiver circuitry 420, and processed by processor(s) 410). However, this can be too large for a common channel received by all or a group of UEs inside a cell. Thus, in various aspects, techniques discussed herein can be employed to minimize or reduce the signaling overhead for group common PDCCH.

In various aspects, a BS (e.g., gNB) can select (e.g., via processor(s) 510) a limited number of slot formats (e.g., from the K possible slot formats or some predefined subset thereof) for potential use within that cell and can configure that set of slot formats or a set of combinations for slot formats for the group of UEs (e.g., some or all UEs in a cell) via higher layer signaling (e.g., generated by processor(s) 510, transmitted via communication circuitry 520, received via transceiver circuitry 420, and processed by processor(s) 410), for example, via system information or RRC (Radio Resource Control) signaling. In various aspects, the number of slot formats selected by the BS can be relatively small compared to K, and can be, for example, an integer power of 2 (e.g., 2, 4, 8, etc.). In such aspects, the group common PDCCH (e.g., generated by processor(s) 510, transmitted via communication circuitry 520, received via transceiver circuitry 420, and processed by processor(s) 410) can indicate one slot format from the set of slot formats configured by higher layers (e.g., via higher layer signaling generated by processor(s) 510, transmitted via communication circuitry 520, received via transceiver circuitry 420, and processed by processor(s) 410). Thus, the slot format can be dynamically selected (e.g., by processor(s) 510) from the configured slot formats sets and updated slot by slot or every predetermined (or configured) time period (e.g., via group common PDCCH generated by processor(s) 510, transmitted via communication circuitry 520, received via transceiver circuitry 420, and processed by processor(s) 410).

The slots in which the UE monitors (e.g., via processor(s) 410 and transceiver circuitry 420) group common PDCCH (e.g., generated by processor(s) 510, transmitted via communication circuitry 520, received via transceiver circuitry 420, and processed by processor(s) 410) can be configured by higher layers (e.g., via higher layer signaling generated by processor(s) 510, transmitted via communication circuitry 520, received via transceiver circuitry 420, and processed by processor(s) 410). In some aspects, the group common PDCCH (e.g., generated by processor(s) 510) can be transmitted (e.g., by communication circuitry 520) periodically in the time domain. In various such aspects, that period and one or more potential slots used for transmission (e.g., via communication circuitry 520) of group common PDCCH (e.g., generated by processor(s) 510) within a period can be configured as part of RRC signaling (e.g., generated by processor(s) 510, transmitted via communication circuitry 520, received via transceiver circuitry 420, and processed by processor(s) 410). In some aspects, when the UE does not detect (e.g., via processor(s) 410 and transceiver circuitry 420) the group common PDCCH (e.g., whether it is or is not generated by processor(s) 510 and transmitted by communication circuitry 520) for a slot, or the group common PDCCH signaling is not present in higher layers, the UE can assume a particular (e.g., default) slot format, which can either be pre-determined (e.g., in a specification) or can be configured by higher layer (e.g., via system information or RRC generated by processor(s) 510, transmitted via communication circuitry 520, received via transceiver circuitry 420, and processed by processor(s) 410). In other aspects, when the UE does not detect group common PDCCH within configured slot sets, the UE can assume (e.g., via processor(s) 410) that slot has the same slot format as the slot format of the previous slot.

Additionally, in various aspects, configured slot formats can be overridden by a parameter indicated via one of the system information (e.g., one of NR RMSI (Remaining Minimum System Information) or NR OSI (Other System Information)) or RRC signaling (e.g., generated by processor(s) 510, transmitted via communication circuitry 520, received via transceiver circuitry 420, and processed by processor(s) 410). In various such aspects, this parameter can contain information regarding the duration or position of one or more of reserved resource(s) (e.g., symbols, etc.)/blank resource(s) or resource(s) which can be used for other features (e.g., SL, features of future releases, etc.).

In some aspects, the slot format indication (SFI) carried in the group common PDCCH (e.g., generated by processor(s) 510, transmitted via communication circuitry 520, received via transceiver circuitry 420, and processed by processor(s) 410) can indicate the SFI corresponding to a number of consecutive slots starting with the slot carrying the group common PDCCH. In various aspects, the number of slots sharing a common slot format can be configured via higher layers (e.g., NR SI (e.g., RMSI/OSI) messages generated by processor(s) 510, transmitted via communication circuitry 520, received via transceiver circuitry 420, and processed by processor(s) 410), via an information field in the group common PDCCH itself, or via a combination of higher layer message (e.g., generated by processor(s) 510, transmitted via communication circuitry 520, received via transceiver circuitry 420, and processed by processor(s) 410) and the group common PDCCH (e.g., generated by processor(s) 510, transmitted via communication circuitry 520, received via transceiver circuitry 420, and processed by processor(s) 410).

As one example, for TDD systems, the SFI in the group common PDCCH (e.g., generated by processor(s) 510, transmitted via communication circuitry 520, received via transceiver circuitry 420, and processed by processor(s) 410) can indicate the slot format for the current slot and the default slot format for the subsequent slots. Thus, unless an indication via another DCI, group common PDCCH, or RRC configuration indicates otherwise, the UE can assume (e.g., via processor(s) 410) the default slot format as indicated in the latest group common PDCCH (e.g., generated by processor(s) 510, transmitted via communication circuitry 520, received via transceiver circuitry 420, and processed by processor(s) 410).

Channel Structure Design for Group Common PDCCH for Efficient Channel Estimation One significant difference between NR and LTE (Long Term Evolution) is that there is no CRS (Cell-specific Reference Signal) transmission in NR. Therefore, the PDCCH (e.g., generated by processor(s) 510) can be transmitted (e.g., by communication circuitry 520) with DMRS (Demodulation Reference Signal) and DMRS can be used (e.g., by processor(s) 410 and transceiver circuitry 420) for the channel estimation of the received PDCCH. The same can apply for channel estimation (e.g., by processor(s) 410 and transceiver circuitry 420) based on received group common PDCCH. However, group common PDCCH is a channel that should be correctly received by a group of UEs or all UEs in a cell, so group common PDCCH (e.g., generated by processor(s) 510) should be transmitted (e.g., by communication circuitry 520) with high reliability. This high reliability for the transmission of group common PDCCH should be sufficient to guarantee frequency diversity, sufficient channel coding, and efficient channel estimation.

Figure 8:
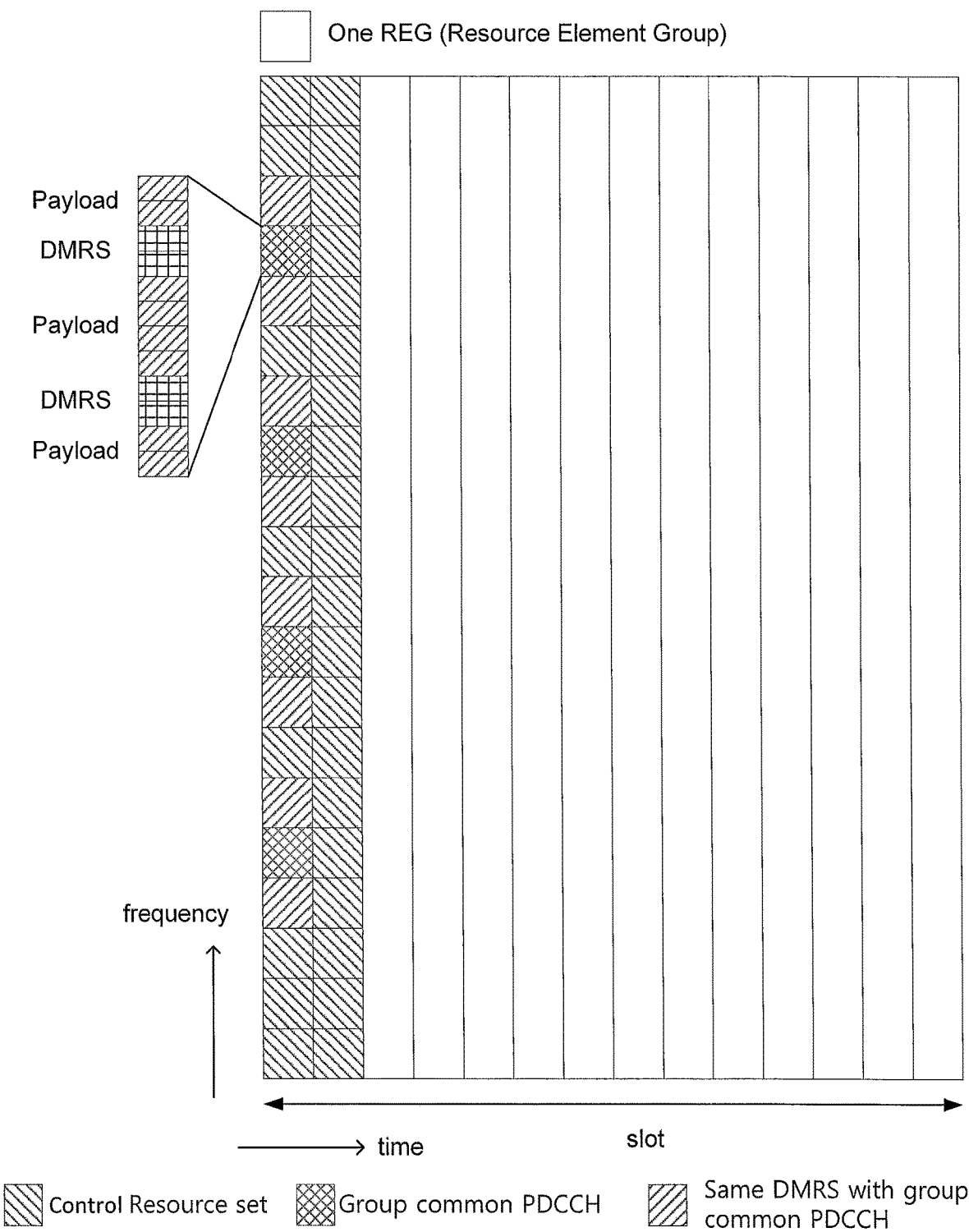
FIG. 8 is a diagram illustrating a first example channel structure for a control resource set, according to various aspects discussed herein.

In various aspects, a first channel structure discussed herein can be employed for group common PDCCH (e.g., generated by processor(s) 510, transmitted via communication circuitry 520, received via transceiver circuitry 420, and processed by processor(s) 410) to provide sufficient DMRS resources for improved channel estimation as well as sufficient frequency diversity gain. In the first channel structure, the control resource set can comprise multiple REGs (Resource Element Groups), where one REG comprises 12 subcarriers and a one symbol duration. Referring to FIG. 8, illustrated is a diagram showing a first example channel structure for a control resource set, according to various aspects discussed herein. In the example of FIG. 8, the control resource set has 20 REGs in the frequency domain and 2 OFDM symbols in the time domain with one REG comprising 4 REs (Resource Elements) for DMRS and 8 REs for payload. The group common PDCCH (e.g., generated by processor(s) 510) can be transmitted (e.g., by communication circuitry 520) in the first symbol of the control resource set and can be transmitted in multiple REGs to provide sufficient coding gain. In various aspects, the control resource set can be a control resource set for a group or a common search space. Additionally, the REGs can be scattered in the frequency domain to obtain as much frequency diversity gain as possible. If distributed REGs are employed (e.g., by processor(s) 510 and communication circuitry 520) for the transmission (e.g., via communication circuitry 520) of group common PDCCH (e.g., generated by processor(s) 510), channel estimation performance may not be guaranteed if the UE (e.g., via processor(s) 410) only uses DMRS from inside the REGs for decoding group common PDCCH for channel estimation. Thus, in various aspects, K REGs (on each side) next to the REGs in which group common PDCCH (e.g., generated by processor(s) 510) is actually transmitted (e.g., via communication circuitry 520) can employ the same antenna ports and the same precoder (e.g., as selected by processor(s) 510) for the transmission (e.g., via communication circuitry 520) of DMRS (e.g., generated by processor(s) 510), where K can be predefined in the specification (e.g., K=2, or more or fewer), or configured by higher layers via NR system information (e.g., NR RMSI or NR OSI) or RRC signaling (e.g., wherein the NR system information or RRC signaling can be generated by processor(s) 510, transmitted via communication circuitry 520, received via transceiver circuitry 420, and processed by processor(s) 410). In such a scenario, the UE can assume (e.g., via processor(s) 410) that the DMRS in REGs that are next to (e.g., within K REGs of) the REGs for the transmission (e.g., via communication circuitry 520) of the group common PDCCH (e.g., generated by processor(s) 510) employ the same antenna ports as the DMRS in REGs for the group common PDCCH itself. Thus, in such aspects, the UE can perform channel estimation (e.g., via processor(s) 410 and transceiver circuitry 420) based on the DMRS of both the REGs for the group common PDCCHs and neighboring REGs (e.g., within K REGs of the group common PDCCH).

Additionally, although as shown in FIG. 8 (and FIG. 9, discussed below), distributed resources are allocated for the transmission of group common PDCCH, these same aspects can be straightforwardly extended to the case when a number (e.g., 2 or some other number) of distributed resources are allocated. In one example, 2 REGs can be allocated in contiguous resources (e.g., by processor(s) 510) while another 2 REGs can be allocated in different resources (e.g., by processor(s) 510).

Because there are other common channels (e.g., generated by processor(s) 510) that can be transmitted (e.g., via communication circuitry 520) in the same control resource sets, the REGs next to group common PDCCH can be employed (e.g., by processor(s) 510) for the transmission (e.g., via communication circuitry 520) of other common channels (e.g., generated by processor(s) 510) in scenarios wherein it can be advantageous to employ the same DMRS antenna ports and precoders as the group common PDCCH. In aspects wherein there is no other common PDCCH, the BS (e.g., gNB) can transmit (e.g., via communication circuitry 520) DMRS (e.g., generated by processor(s) 510) in the neighboring REGs, or can transmit (e.g., via processor(s) 510) UE-specific PDCCH (e.g., generated by processor(s) 510) using DMRS which is the same as that of the group common PDCCH.

In various aspects, a second channel structure can be employed (e.g., by processor(s) 510 and communication circuitry 520) for group common PDCCH (e.g., generated by processor(s) 510), which can provide sufficient DMRS resources for improved channel estimation as well as sufficient frequency diversity gain. In the second channel structure, the group common PDCCH (e.g., generated by processor(s) 510) can be transmitted (e.g., via communication circuitry 520) in the first symbol of the control resource set and can be transmitted (e.g., via communication circuitry 520) in multiple REGs for sufficient coding gain. Additionally, in aspects, those REGs can be scattered in the frequency domain, which can improve frequency diversity gain.

Figure 9:
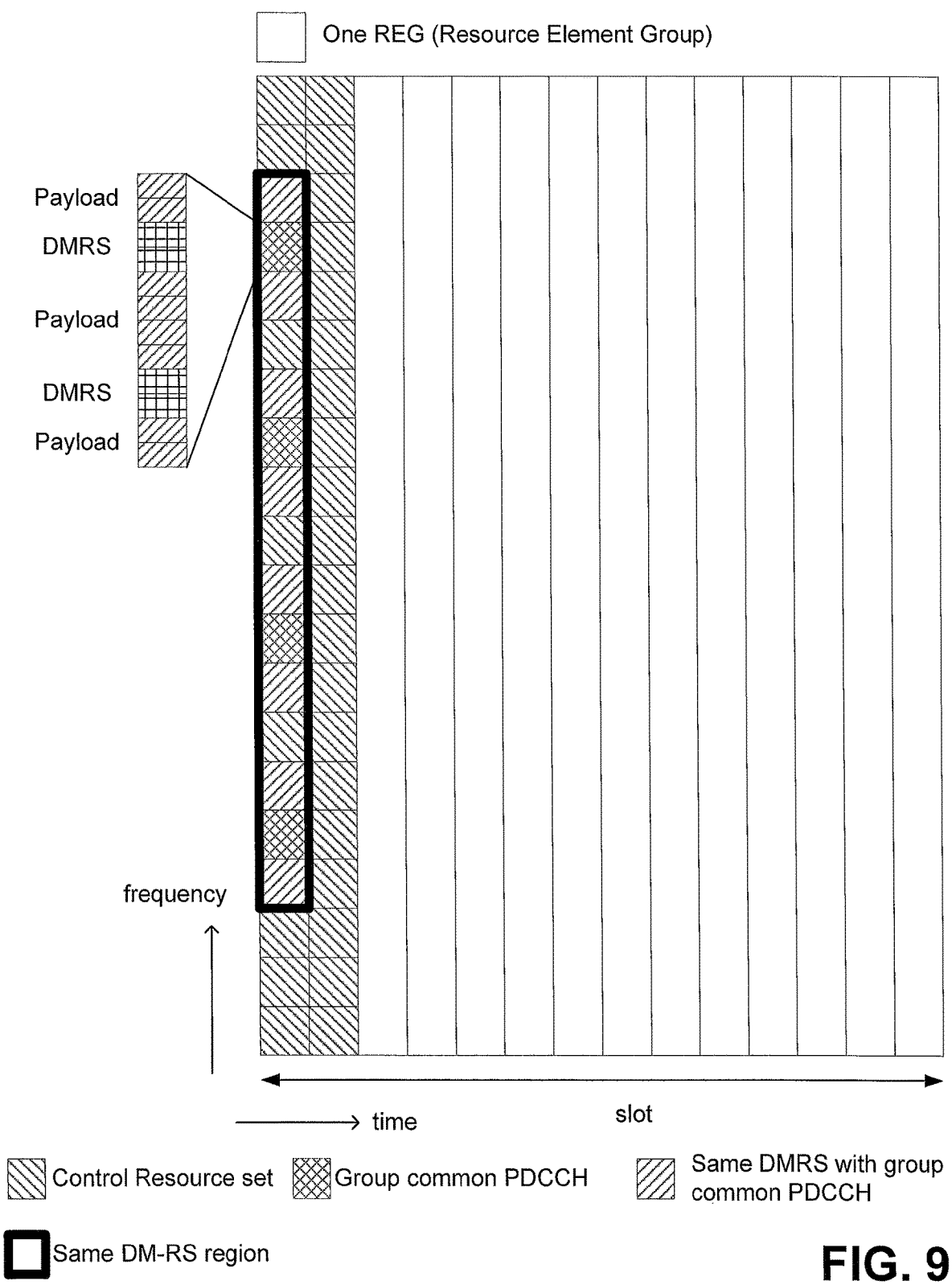
FIG. 9 is a diagram illustrating a second example channel structure for a control resource set, according to various aspects discussed herein.

In various aspects, for channel estimation, the gNB can configure region(s) inside the control resource set where the same DMRS and/or precoder(s) can be assumed by the UEs (e.g., via processor(s) 410). Referring to FIG. 9, illustrated is a diagram showing a second example channel structure for a control resource set, according to various aspects discussed herein. In FIG. 9, a region having the same DMRS is indicated as "same DMRS region," although in various aspects, such a configured region can employ the same DMRS and/or precoder(s). It can be advantageous for such a region (e.g., wherein a UE can be configured to assume the same DMRS and/or precoder(s) to include the REGs for group common PDCCH with some margins in each edge of the frequency domain. Then the UE can assume (e.g., via processor(s) 410) the same DMRS in REGs inside the configured region as in the REGs for group common PDCCH. Thus, for channel estimation of the group common PDCCH or regular PDCCH inside the configured region, the UE can utilize (e.g., via processor(s) 410 and transceiver circuitry 420) all DMRS inside the configured region, and the channel estimation performance can be improved and ensured for the group common PDCCH.

In various aspects, the bandwidth for the transmission of group common PDCCH can be predefined in the specification or can be configured by higher layers via NR MSI (Minimum System Information), NR RMSI (Remaining MSI), NR OSI (Other System Information), or RRC signaling (e.g., generated by processor(s) 510, transmitted via communication circuitry 520, received via transceiver circuitry 420, and processed by processor(s) 410). In one example, the BS (e.g., gNB) can configure (e.g., via higher layer signaling generated by processor(s) 510 and transmitted via communication circuitry 520) a sub-band within a wider system bandwidth for the transmission (e.g., via communication circuitry 520) of group common PDCCH (e.g., generated by processor(s) 510). As discussed above, in various aspects, the resource allocated (e.g., by processor(s) 510) for the transmission (e.g., via communication circuitry 520) of group common PDCCH (e.g., generated by processor(s) 510) can be equally distributed within the sub-band. In aspect, the sub-band can be part of control resource set which is used for group or common search space.

In various aspects, the BS (e.g., gNB) can transmit (e.g., via communication circuitry 520) a plurality of group common PDCCHs (e.g., generated by processor(s) 510) within the same symbol, wherein each group common PDCCH of the plurality can be targeted for a group of UEs within a cell. Additionally, in aspects, different group common PDCCHs (e.g., generated by processor(s) 510) can be transmitted (e.g., via communication circuitry 520) within different control resource sets (e.g., generated by processor(s) 510, transmitted via communication circuitry 520, received via transceiver circuitry 420, and processed by processor(s) 410). Depending on the scenario, different group common PDCCHs can be targeted for different UE capabilities or for forward compatibility. For example, UEs in a future release could obtain the slot format information from different group common PDCCHs than UEs in a current release. Similarly, the slot format information in future release could be interpreted in a different way from the current release.

In various aspects, the group common PDCCH can have a structure similar to a CRC (Cyclic Redundancy Check)-less LTE (Long Term Evolution) PCFICH (Physical Control Format Indicator Channel), and can have a linear block code (e.g., Reed Muller code, etc.)-based channel encoded physical channel structure with a limited number of bits, which can facilitate quick decoding so as to maximize the benefits from knowledge of the slot format. For example, for a payload size of 8 bits, encoded at a low code rate of $1/16$, 128 encoded bits are generated. These bits can be transmitted using QPSK (Quadrature Phase Shift Keying) modulation in 8 REGs or 4 REG-bundles, assuming each REG-bundle as a set of two consecutive REGs in frequency domain. Defining the resources for group common PDCCH in terms of REG-bundles can enable easier multiplexing with NR PDCCH.

In various aspects, the group common PDCCH (e.g., generated by processor(s) 510), which can employ or not employ the NR PDCCH physical channel structure, can be transmitted (e.g., via communication circuitry 520) using resources that can be a multiple of a NR PDCCH CCE (Control Channel Element) size of 6 REGs. As one example, a possibly larger payload can be carried using 12 REGs, corresponding to 6 REG-bundles (for a REG-bundle size=2 REGs) or 4 REG-bundles (for a REG-bundle size=3 REGs). This can be similar to the set of resources used to transmit an NR PDCCH using a NR-CCE size of 6 REGs and aggregation level (AL) of 2, thereby facilitating easier multiplexing with NR PDCCH. In aspects, this scheme can be applied for larger payload size cases as well, for example, 24 REGs, or 48 REGs with suitable scaling factors.

In various aspects, in slots that the UE is configured (e.g., via higher layer signaling generated by processor(s) 510, transmitted via communication circuitry 520, received via transceiver circuitry 420, and processed by processor(s) 410) to monitor for group common PDCCH, the resources corresponding to the transmission of group common PDCCH can be reserved, and the NR PDCCH and/or NR PDSCH are rate-matched around these resources.

Additionally, in aspects wherein group common PDCCH employs the NR PDCCH channel structure, depending on the payload, the aggregation level (AL) can be configured via NR RMSI or NR OSI signaling (e.g., generated by processor(s) 510, transmitted via communication circuitry 520, received via transceiver circuitry 420, and processed by processor(s) 410) or can be predefined in the specification. Additionally, in aspects, a relatively small number of blind decoding candidates can be defined. In one example, only a single candidate can be defined. Additionally, in various aspects, distributed PDCCH with frequency-first mapping can be assumed (e.g., by processor(s) 410) for the PDCCH candidate(s) carrying group common PDCCH. In aspects, a single common compact DCI format can be used (e.g., by processor(s) 510) or a dedicated DCI format (e.g., generated by processor(s) 510) defined to convey the contents of group common PDCCH. When the common compact DCI format is employed, the size of the DCI format can be the same as that of the DCI monitored in the CSS (Common Search Space) in the slot.

In various aspects, group common PDCCH (e.g., generated by processor(s) 510) using an NR PDCCH structure using Parity Check aided Polar Codes (PC-Polar Codes) can be transmitted (e.g., by communication circuitry 520) using AL 1 or 2, thereby realizing similar resource overhead as the PCFICH-based channel structure.

To handle inter-cell interference in scenarios involving time-aligned neighboring cells, inter-cell interference randomization can be achieved by one or more of: (a) configuring different resources for CORESET (Control Resource Set)—at least for CSS—for different cells; (b) configuring a different periodicity of group common PDCCH for different cells; and/or (c) interleaving (e.g., via processor(s) 510 and communication circuitry 520 at each of the cells) of REG bundles depending on cell ID, which can employ distributed Tx (Transmission) that applies (e.g., via processor(s) 510 and communication circuitry 520 at each of the cells) frequency domain cell-specific cyclic shifts to the REGs or to the starting REG-bundle (wherein the REG-bundles can be distributed with respect to the starting REG-bundle).

In various aspects, varied DMRS patterns can be defined (e.g., in the specification) and employed (e.g., via processor(s) 510 and communication circuitry 520) with respect to different NR PDCCH channels or search spaces, which can balance the tradeoff between channel estimation and rate-loss due to DMRS overhead. The common PDCCH and UE-specific PDCCH have different specifications in terms of performance, payload size, scheduling, etc. In some design, as common PDCCH targets for a group of UEs, a larger number of DMRS REs (e.g., generated by processor(s) 510) can be used (e.g., by processor(s) 510 and communication circuitry 520) in each NR REG for constructing the common PDCCH in order to get a better channel estimation (e.g., at system 400), but at the cost of lower code rate. In aspects, to offset this lower code rate, one CCE of common PDCCH (e.g., generated by processor(s) 510) can comprise a larger number of NR REGs, as compared to the UE-specific search space.

In various aspects, different DMRS types can be used (e.g., by processor(s) 510 and communication circuitry 520) for common PDCCH and a UE-specific search space. In such aspects, a search space or channel dependent RS (Reference Signal) type can be defined for NR PDCCH channel. In some such designs, a common DMRS (C-DMRS) can be used for common PDCCH, similar to how CRS is used in LTE. In some such aspects, the UE can assume (e.g., via processor(s) 410) the same precoder(s) are applied on all REGs within a common control resource set for DMRS antenna ports. Additionally, in some such aspects, a different DMRS with UE-specific precoder(s) can be applied (e.g., by processor(s) 510 and communication circuitry 520) for USS (UE-specific Search Space) PDCCH.

In various aspects, different DMRS patterns may be used for localized PDCCH and distributed PDCCH. In such aspects, a different DMRS density can be employed (e.g., by processor(s) 510 and communication circuitry 520) for localized and distributed PDCCH; in one example, 4 DMRS REs per REG can be used for localized PDCCH and 6 DMRS REs per REG can be used for distributed PDCCH. In various aspects, more DMRS REs per REG can be used for distributed PDCCH because the channel estimation performance for distributed transmission is not as good as that for localized transmission, so having more DMRS REs for distributed PDCCH can provide improved channel estimation performance.

Additional Embodiments

Figure 10:
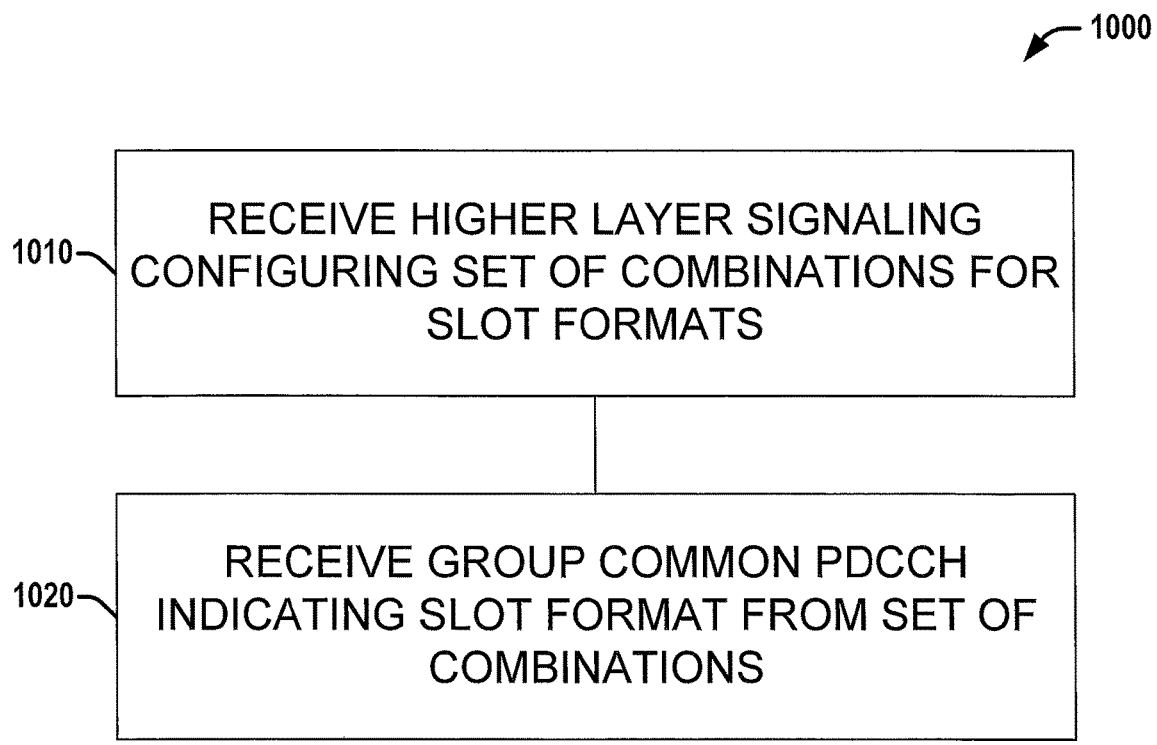
FIG. 10 is a flow diagram of an example method employable at a UE that facilitates reception of NR group common PDCCH, according to various aspects discussed herein.

Referring to FIG. 10, illustrated is a flow diagram of an example method 1000 employable at a UE that facilitates reception of a group common PDCCH, according to various aspects discussed herein. In other aspects, a machine readable medium can store instructions associated with method 1000 that, when executed, can cause a UE to perform the acts of method 1000.

At 1010, higher layer signaling can be received that configures a set of combinations for slot formats, for example, 2, 4, or 8 possible slot formats.

At 1020, group common PDCCH can be received that indicates a slot format of the set of combinations for slot formats.

Additionally or alternatively, method 1000 can include one or more other acts described herein in connection with receiving entity aspects of system 400.

Figure 11:
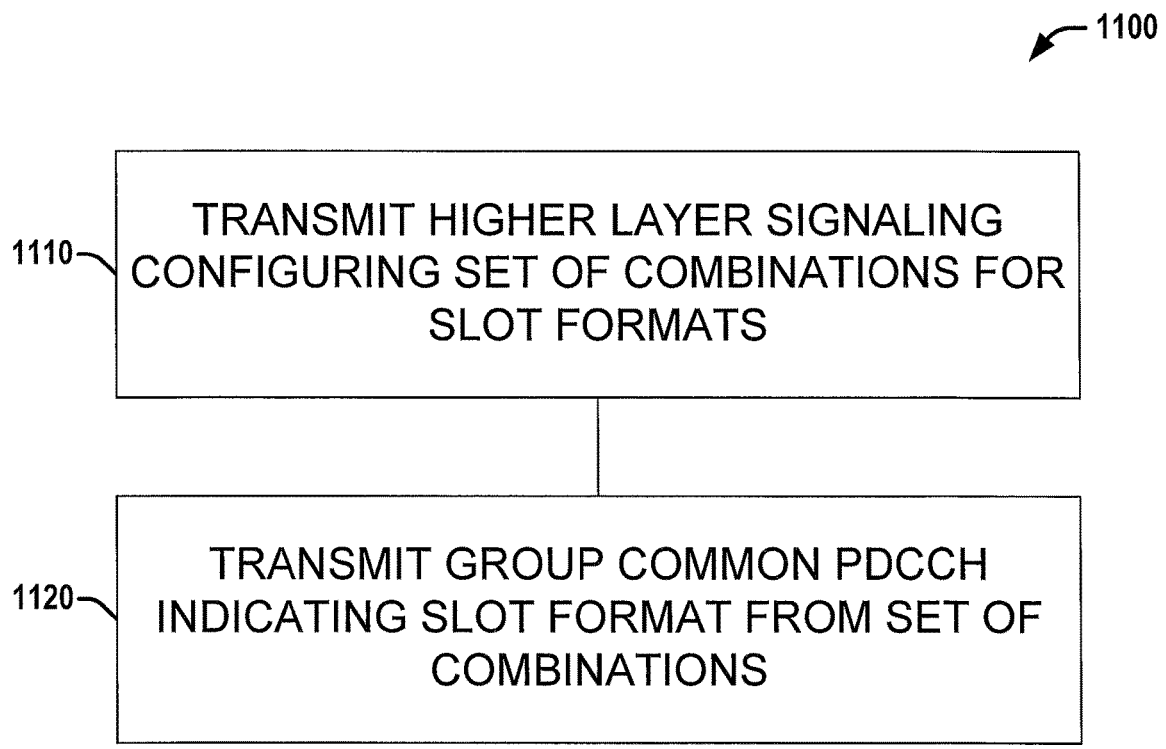
FIG. 11 is a flow diagram of an example method employable at a BS that facilitates transmission of NR group common PDCCH, according to various aspects discussed herein.

Referring to FIG. 11, illustrated is a flow diagram of an example method 1100 employable at a BS that facilitates transmission of group common PDCCH, according to various aspects discussed herein. In other aspects, a machine readable medium can store instructions associated with method 1100 that, when executed, can cause a BS (e.g., eNB, gNB, etc.) to perform the acts of method 1100.

At 1110, higher layer signaling can be transmitted that configures a set of combinations for slot formats.

At 1120, group common PDCCH can be transmitted that indicates a slot format of the set of combinations for slot formats.

Additionally or alternatively, method 1100 can include one or more other acts described herein in connection with transmitting entity aspects of system 500.

A first example embodiment employable in connection with aspects discussed herein can comprise a system and/or method of wireless communication for a fifth generation (5G) or new radio (NR) system, comprising: configuring a set of slot formats for use for dynamic slot format change (e.g., via higher layer signaling generated by processor(s) 510, transmitted via communication circuitry 520, received via transceiver circuitry 420, and processed by processor(s) 410); transmitting, to a group of UEs via a first slot, a common control channel (e.g., generated by processor(s) 510, transmitted via communication circuitry 520, received via transceiver circuitry 420, and processed by processor(s)

410) indicating a first slot format of the set of slot formats (e.g., via a SFI (slot format indicator); determining, by UE(s) (e.g., via processor(s) 410) of the group of UEs) the first slot format for the first slot based on the common control channel (e.g., group common PDCCH).

In various aspects of the first example embodiment, the configuration of the set of slot formats can be via RRC signaling, NR MSI, NR RMSI, or NR OSI (e.g., generated by processor(s) 510, transmitted via communication circuitry 520, received via transceiver circuitry 420, and processed by processor(s) 410).

In various aspects of the first example embodiment, the group of UEs can be all UEs in a cell.

In various aspects of the first example embodiment, the time slot in which the common control channel is transmitted (e.g., the first time slot) can be configured by higher layer signaling (e.g., generated by processor(s) 510, transmitted via communication circuitry 520, received via transceiver circuitry 420, and processed by processor(s) 410) and the UE(s) can search for the channel only in the configured time slot (e.g., via processor(s) 410).

In various aspects of the first example embodiment, the slot format indication (SFI) carried in the common control channel can indicate the SFI corresponding to a number of consecutive slots starting with the slot carrying the group common PDCCH. In various such aspects, the number of slots sharing a common slot format can be configured via higher layers (e.g., NR SI messages), via an information field in the group common PDCCH itself, or via a combination of higher layer message and the common control channel (e.g., wherein the higher layer signaling and/or group common PDCCH can be generated by processor(s) 510, transmitted via communication circuitry 520, received via transceiver circuitry 420, and processed by processor(s) 410).

In various aspects of the first example embodiment, the common control channel can have a physical channel structure without addition of CRC and the information bits can be encoded (e.g., by processor(s) 510) using a linear block code (e.g., Reed Muller code, etc.).

In various aspects of the first example embodiment, for slot(s) that the UE is configured to monitor for the common control channel (e.g., group common PDCCH), the resources corresponding to the common control channel can be reserved and the NR PDCCH and/or NR PDSCH can be rate-matched around these resources (e.g., by processor(s) 510 and transceiver circuitry 520).

In various aspects of the first example embodiment, the common control channel can have the same physical channel structure as NR PDCCH and the corresponding aggregation level (AL) used for the common control channel can be configured via NR RMSI or NR OSI (e.g., generated by processor(s) 510, transmitted via communication circuitry 520, received via transceiver circuitry 420, and processed by processor(s) 410), or predefined in the specification. In various such aspects, only a single PDCCH candidate can be defined. In various such aspects, distributed PDCCH with frequency-first mapping can be employed for the group common PDCCH. In various such aspects, a single common compact DCI format with the same size as that which the UE monitors in the common search space in the slot can be used (e.g., by processor(s) 510) for the group common PDCCH. In various such aspects, Parity Check aided Polar Codes (PC-Polar Codes) can be used (e.g., by processor(s) 510) for channel coding for the common control channel (e.g., group common PDCCH) without adding CRC bits, and the channel can be transmitted using AL 1 or 2.

In various aspects of the first example embodiment, inter-cell interference between neighboring cells can be randomized via one or more of: (a) configuring different resources for CORESET (at least for CSS) for different cells; (b) configuring different periodicity of group common PDCCH for different cells; or (c) interleaving of REG bundles based on cell ID, which can be based on distributed Tx that applies a frequency domain cell-specific cyclic shifts to the REGs or to the starting REG-bundle.

A second example embodiment employable in connection with aspects discussed herein can comprise a system and/or method of wireless communication for a fifth generation (5G) or new radio (NR) system, comprising: configuring (e.g., via higher layer signaling generated by processor(s) 510, transmitted via communication circuitry 520, received via transceiver circuitry 420, and processed by processor(s) 410) a control resource set for transmitting control channel(s) including a common control channel (e.g., group common PDCCH); configuring (e.g., higher layer signaling generated by processor(s) 510, transmitted via communication circuitry 520, received via transceiver circuitry 420, and processed by processor(s) 410) a subband inside the configured control resource set, wherein the configured subband is associated with a common control channel (e.g., generated by processor(s) 510) transmitted (e.g., via communication circuitry 520) to a group of UEs In various aspects of the second example embodiment, the control resource set and the subband inside the configured control resource set can be configured by RRC signaling, NR MSI (Minimum System Information), NR RMSI (Remaining Minimum System Information), or NR OSI (Other System Information) (e.g., generated by processor(s) 510, transmitted via communication circuitry 520, received via transceiver circuitry 420, and processed by processor(s) 410).

In various aspects of the second example embodiment, the UE that receives (e.g., via transceiver circuitry 420) the common control channel (e.g., group common PDCCH) can assume (e.g., via processor(s) 410) that the same DMRS (Demodulation Reference Signal) as in the common control channel is also transmitted in other resources blocks in which the common control channel is not transmitted, wherein the UE can perform channel estimation (e.g., via processor(s) 410 and transceiver circuitry 420) utilizing both the DMRS in the resource block where common control channel is transmitted and the DMRS in resource block(s) where the same DMRS is transmitted, where the same DMRS means the DMRS has the same antenna ports and same precoding.

In various aspects of the second example embodiment, the gNB can configure (e.g., via higher layer signaling generated by processor(s) 510, transmitted via communication circuitry 520, received via transceiver circuitry 420, and processed by processor(s) 410) a region inside the control resource set wherein the same DMRS is transmitted, wherein the common control channel (e.g., group common PDCCH, generated by processor(s) 510) can be transmitted (e.g., via communication circuitry 520) inside the configured region, wherein the UE can perform (e.g., via processor(s) 410 and transceiver circuitry 420) channel estimation utilizing all or part of the DMRS inside the region, wherein same DMRS means that DMRS uses the same antenna ports and same precoding.

In various aspects of the second example embodiment, varied DMRS patterns can be defined and employed (e.g., by processor(s) 510 and/or communication circuitry 520) for different PDCCH channels.

In various aspects of the second example embodiment, varied DMRS patterns can be defined and employed (e.g., by processor(s) 510 and/or communication circuitry 520) for different search spaces.

In various aspects of the second example embodiment, varied DMRS types can be defined and employed (e.g., by processor(s) 510 and/or communication circuitry 520) between the common search space and the UE-specific search space.

In various aspects of the second example embodiment, different DMRS patterns can be defined and employed (e.g., by processor(s) 510 and/or communication circuitry 520) for localized transmission and distributed transmission, wherein localized transmission refers to consecutive resource blocks being allocated (e.g., by processor(s) 510) for the control channel and distributed transmissions refers to nonconsecutive resource blocks being allocated for the control channel.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: process higher layer signaling that configures a set of combinations for slot formats for the UE; detect, via blind decoding on at least a portion of a control resource set, a DCI (Downlink Control Information) message that indicates a combination for slot formats of the set of combinations for slot formats via a SFI (slot format indicator); determine a slot format for one or more slots based on the indicated combination for slot formats, wherein the slot format indicates, for each symbol of the one or more slots, whether that symbol is DL (Downlink), UL (Uplink), or a flexible symbol in the slot format; and send the higher layer signaling to a memory via the memory interface.

Example 2 comprises the subject matter of any variation of any of example(s) 1 (or any other example discussed herein), wherein the higher layer signaling further indicates that all REGs (Resource Element Groups) of the control resource set have the same precoding.

Example 3 comprises the subject matter of any variation of any of example(s) 1 (or any other example discussed herein), wherein the higher layer signaling further indicates, for each symbol of a set of symbols of the one or more slots, whether that symbol is one of DL or UL, wherein the processing circuitry is further configured to assume that symbols is the one of DL or UL.

Example 4 comprises the subject matter of any variation of any of example(s) 1 (or any other example discussed herein), wherein the higher layer signaling further indicates a monitoring period associated with the DCI message that indicates the combination for slot formats, wherein the monitoring period indicates a number of slots of the one or more slots.

Example 5 comprises the subject matter of any variation of any of example(s) 4 (or any other example discussed herein), wherein the higher layer signaling further indicates one or more potential slots for blind decoding of the DCI message that indicates the combination for slot formats.

Example 6 comprises the subject matter of any variation of any of example(s) 5 (or any other example discussed herein), wherein the one or more potential slots is a single slot.

Example 7 comprises the subject matter of any variation of any of example(s) 1-3 (or any other example discussed herein), wherein the DCI message further indicates a monitoring period associated with the DCI message that indicates the combination for slot formats, wherein the monitoring period indicates a number of slots of the one or more slots.

Example 8 comprises the subject matter of any variation of any of example(s) 1-6 (or any other example discussed herein), wherein the at least the portion of the control resource set comprises a group common PDCCH (Physical Downlink Control Channel) with a CRC (Cyclic Redundancy Check)-less channel structure using a linear block code.

Example 9 comprises the subject matter of any variation of any of example(s) 1-6 (or any other example discussed herein), wherein the at least the portion of the control resource set comprises a group common PDCCH (Physical Downlink Control Channel), wherein the control resource set further comprises NR (New Radio) PDCCH (Physical Downlink Control Channel), wherein the group common PDCCH and the NR PDCCH share a common channel structure, and wherein an AL (Aggregation Level) of the group common PDCCH is one of predefined or indicated via the higher layer signaling.

Example 11 comprises the subject matter of any variation of any of example(s) 9 (or any other example discussed herein), wherein the at least the portion of the control resource set comprises a distributed group common PDCCH (Physical Downlink Control Channel) with frequency-first mapping.

Example 12 comprises the subject matter of any variation of any of example(s) 9 (or any other example discussed herein), wherein the control resource set comprises a common search space, and wherein the common search space and the DCI message both have a common compact DCI format.

Example 13 comprises the subject matter of any variation of any of example(s) 1-6 (or any other example discussed herein), wherein the higher layer signaling comprises one or more of NR (New Radio) MSI (Minimum System Information), NR RMSI (Remaining MSI), NR OSI (Other System Information), or NR RRC (Radio Resource Control) signaling.

Example 14 is an apparatus configured to be employed in a gNB (next generation Node B), comprising: a memory interface; and processing circuitry configured to: generate higher layer signaling that configures a set of combinations for slot formats for one or more UEs; encode a DCI (Downlink Control Information) message that indicates a combination for slot formats of the set of combinations for slot formats via a SFI (slot format indicator), wherein the combination for slot format indicates, for each symbol of one or more slots, whether that symbol is a DL (Downlink) symbol, an UL (Uplink) symbol, or a flexible symbol; map the DCI message to a group common PDCCH (Physical Downlink Control Channel) of a control resource set within a first slot of the one or more slots; and send the set of combinations for slot formats to a memory via the memory interface.

Example 15 comprises the subject matter of any variation of any of example(s) 14 (or any other example discussed herein), wherein the one or more UEs comprise all UEs in a cell of the gNB.

Example 16 comprises the subject matter of any variation of any of example(s) 14 (or any other example discussed herein), wherein the higher layer signaling further indicates that all REGs (Resource Element Groups) of the control resource set have the same precoding.

Example 17 comprises the subject matter of any variation of any of example(s) 14 (or any other example discussed herein), wherein the higher layer signaling further indicates, for each symbol of a set of symbols of the one or more slots, whether that symbol is one of DL or UL.

Example 18 comprises the subject matter of any variation of any of example(s) 14 (or any other example discussed herein), wherein the higher layer signaling further indicates a monitoring period associated with the DCI message that indicates the combination for slot formats, wherein the monitoring period indicates a number of slots of the one or more slots.

Example 19 comprises the subject matter of any variation of any of example(s) 18 (or any other example discussed herein), wherein the higher layer signaling further indicates one or more potential slots for blind decoding of the DCI message that indicates the combination for slot formats.

Example 20 comprises the subject matter of any variation of any of example(s) 19 (or any other example discussed herein), wherein the one or more potential slots is a single slot.

Example 21 comprises the subject matter of any variation of any of example(s) 19 (or any other example discussed herein), wherein the processing circuitry is further configured to: reserve resources corresponding to the control resource set in the one or more potential slots; and rate match one or more of NR (New Radio) PDSCH (Physical Downlink Shared Channel) or NR PDCCH (Physical Downlink Control Channel) around the resources corresponding to the control resource set in the one or more potential slots.

Example 22 comprises the subject matter of any variation of any of example(s) 14 (or any other example discussed herein), wherein the group common PDCCH is CRC (Cyclic Redundancy Check)-less, wherein the processing circuitry is further configured to channel code the group common PDCCH based on Parity Check aided Polar Codes (PC-Polar Codes), and wherein the group common PDCCH has an AL (Aggregation Level) of 1 or 2.

Example 23 comprises the subject matter of any variation of any of example(s) 14 (or any other example discussed herein), wherein the processing circuitry is further configured to facilitate randomized inter-cell interference via one or more of: configuring, for the control resource set, different resources than at least one cell neighboring the gNB; configuring, for the group common PDCCH, a different periodicity than the at least one cell neighboring the gNB; or interleaving REG (Resource Element Group) bundles of the group common PDCCH based on a cell ID (Identity) of the gNB based on applying a cell-specific frequency-domain cyclic shift to at least a starting REG bundle of the REG bundles.

Example 24 is an apparatus configured to be employed in a UE (User Equipment), comprising: a memory interface; and processing circuitry configured to: process first higher layer signaling that configures a control resource set for one or more DL (Downlink) control channels comprising a group common PDCCH (Physical Downlink Control Channel); process second higher layer signaling that configures a subband within the control resource set for the group common PDCCH; and send the first higher layer signaling and the second higher layer signaling to a memory via the memory interface.

Example 25 comprises the subject matter of any variation of any of example(s) 24 (or any other example discussed herein), wherein the processing circuitry is further configured to process third higher layer signaling that configures a region within the control resource set, wherein the region comprises the group common PDCCH, and wherein DMRS (Demodulation Reference Signal) of the region have one or more of a common antenna port or common precoding.

Example 26 comprises the subject matter of any variation of any of example(s) 25 (or any other example discussed herein), wherein the processing circuitry is further configured to perform channel estimation based on the DMRS of the region.

Example 27 comprises the subject matter of any variation of any of example(s) 24-26 (or any other example discussed herein), wherein each of the first higher layer signaling and the second higher layer signaling comprises one or more of NR (New Radio) MSI (Minimum System Information), NR RMSI (Remaining MSI), NR OSI (Other System Information), or NR RRC (Radio Resource Control) signaling.

Example 28 is an apparatus configured to be employed in a gNB (next generation Node B), comprising: a memory interface; and processing circuitry configured to: generate first higher layer signaling that configures a control resource set for one or more DL (Downlink) control channels comprising a group common PDCCH (Physical Downlink Control Channel); generate second higher layer signaling that configures a subband within the control resource set for the group common PDCCH; and send the first higher layer signaling and the second higher layer signaling to a memory via the memory interface.

Example 29 comprises the subject matter of any variation of any of example(s) 28 (or any other example discussed herein), wherein the one or more DL control channels comprises a first DL control channel associated with a first DMRS (Demodulation Reference Signal) pattern and a distinct second DL control channel associated with a second DMRS pattern, wherein the first DMRS pattern is distinct from the second DMRS pattern.

Example 30 comprises the subject matter of any variation of any of example(s) 28 (or any other example discussed herein), wherein the control resource set comprises a first search space associated with a first DMRS (Demodulation Reference Signal) pattern and a distinct second search space associated with a second DMRS pattern, wherein the first DMRS pattern is distinct from the second DMRS pattern.

Example 31 comprises an apparatus comprising means for executing any of the described operations of examples 1-30.

Example 32 comprises a machine readable medium that stores instructions for execution by a processor to perform any of the described operations of examples 1-30.

Example 33 comprises an apparatus comprising: a memory interface; and processing circuitry configured to: perform any of the described operations of examples 1-30.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An UE (User Equipment), comprising:
a memory interface; and
processing circuitry configured to:
   process higher layer signaling that configures a set of combinations of for slot formats for the UE;
   detect, via blind decoding on at least a portion of a control resource set, a DCI (Downlink Control Information) message that indicates a combination of for slot formats of the set of combinations of slot formats via a SFI (slot format indicator);
   determine a slot format for one or more slots based on the indicated combination of slot formats, wherein the slot format indicates, for each symbol of the one or more slots, whether that symbol is DL (Downlink), UL (Uplink), or a flexible symbol in the slot format; and
   send the higher layer signaling to a memory via the memory interface.

2. The UE of claim 1, wherein the higher layer signaling further indicates that all REGs (Resource Element Groups) of the control resource set have the same precoding.

3. The UE of claim 1, wherein the higher layer signaling further indicates, for each symbol of a set of symbols of the one or more slots, whether that symbol is one of DL or UL, wherein the processing circuitry is further configured to assume that symbols is the one of DL or UL.

4. The UE of claim 1, wherein the higher layer signaling further indicates a monitoring period associated with the DCI message that indicates the combination of for slot formats, wherein the monitoring period indicates a number of slots of the one or more slots.

5. The UE of claim 4, wherein the higher layer signaling further indicates one or more potential slots for blind decoding of the DCI message that indicates the combination of for slot formats.

6. The UE of claim 5, wherein the one or more potential slots is a single slot.

7. The UE of claim 1, wherein the DCI message further indicates a monitoring period associated with the DCI message that indicates the combination of for slot formats, wherein the monitoring period indicates a number of slots of the one or more slots.

8. The UE of claim 1, wherein the at least the portion of the control resource set comprises a group common PDCCH (Physical Downlink Control Channel) with a CRC (Cyclic Redundancy Check)-less channel structure using a linear block code.

9. The UE of claim 1, wherein the at least the portion of the control resource set comprises a group common PDCCH (Physical Downlink Control Channel), wherein the control resource set further comprises NR (New Radio) PDCCH (Physical Downlink Control Channel), wherein the group common PDCCH and the NR PDCCH share a common channel structure, and wherein an AL (Aggregation Level) of the group common PDCCH is one of predefined or indicated via the higher layer signaling.

10. The UE of claim 9, wherein the at least the portion of the control resource set comprises a distributed group common PDCCH (Physical Downlink Control Channel) with frequency-first mapping.

11. The UE of claim 9, wherein the control resource set comprises a common search space, and wherein the common search space and the DCI message both have a common compact DCI format.

12. The UE of claim 1, wherein the higher layer signaling comprises one or more of NR (New Radio) MSI (Minimum System Information), NR RMSI (Remaining MSI), NR OSI (Other System Information), or NR RRC (Radio Resource Control) signaling.

13. A method performed by a user equipment (UE), the method comprising:
   processing, by the UE, higher layer signaling that configures a set of combinations of slot formats for the UE;
   detecting, by the UE via blind decoding on at least a portion of a control resource set, a DCI (Downlink Control Information) message that indicates a combination of slot formats of the set of combinations of slot formats via a SFI (slot format indicator);
   determining, by the UE, a slot format for one or more slots based on the indicated combination of slot formats, wherein the slot format indicates, for each symbol of the one or more slots, whether that symbol is DL (Downlink), UL (Uplink), or a flexible symbol in the slot format; and
   sending, by the UE, the higher layer signaling to a memory via a memory interface of the UE.

14. The method of claim 13, wherein the higher layer signaling further indicates that all REGs (Resource Element Groups) of the control resource set have the same precoding.

15. The method of claim 13, wherein the higher layer signaling further indicates, for each symbol of a set of symbols of the one or more slots, whether that symbol is one of DL or UL, wherein the method further comprising: assuming, by the UE, that symbols is the one of DL or UL.

16. The method of claim 13, wherein the higher layer signaling further indicates a monitoring period associated with the DCI message that indicates the combination of slot formats, wherein the monitoring period indicates a number of slots of the one or more slots.

17. The method of claim 16, wherein the higher layer signaling further indicates one or more potential slots for blind decoding of the DCI message that indicates the combination of slot formats.

18. The method of claim 17, wherein the one or more potential slots is a single slot.

19. The method of claim 13, wherein the DCI message further indicates a monitoring period associated with the DCI message that indicates the combination of slot formats, wherein the monitoring period indicates a number of slots of the one or more slots.

20. The method of claim 13, wherein the at least the portion of the control resource set comprises a group common PDCCH (Physical Downlink Control Channel) with a CRC (Cyclic Redundancy Check)-less channel structure using a linear block code.

21. The method of claim 13, wherein the at least the portion of the control resource set comprises a group common PDCCH (Physical Downlink Control Channel), wherein the control resource set further comprises NR (New Radio) PDCCH (Physical Downlink Control Channel), wherein the group common PDCCH and the NR PDCCH share a common channel structure, and wherein an AL (Aggregation Level) of the group common PDCCH is one of predefined or indicated via the higher layer signaling.

22. The method of claim 21, wherein the at least the portion of the control resource set comprises a distributed group common PDCCH (Physical Downlink Control Channel) with frequency-first mapping.

23. The method of claim 22, wherein the control resource set comprises a common search space, and wherein the common search space and the DCI message both have a common compact DCI format.

24. The method of claim 23, wherein the higher layer signaling comprises one or more of NR (New Radio) MSI (Minimum System Information), NR RMSI (Remaining MSI), NR OSI (Other System Information), or NR RRC (Radio Resource Control) signaling.

25. A base station, comprising:
a memory interface; and
processing circuitry configured to:
   transmit, to one or more user equipment (UEs), higher layer signaling that configures a set of combinations of slot formats for the one or more UEs;
   encode, on at least a portion of a control resource set for blind decoding by the one or more UEs, a DCI (Downlink Control Information) message that indicates a combination of slot formats of the set of combinations of slot formats via a SFI (slot format indicator),
   wherein the combination of slot formats indicates, for each symbol of one or more slots, whether that symbol is a DL (Downlink) symbol, an UL (Uplink) symbol, or a flexible symbol; and
   transmit, to the one or more UEs, the combination of slot formats.

26. The base station of claim 25, wherein the one or more UEs comprise all UEs in a cell of the base station.

27. The base station of claim 25, wherein the higher layer signaling further indicates that all REGs (Resource Element Groups) of the control resource set have the same precoding.

28. The base station of claim 25, wherein the higher layer signaling further indicates, for each symbol of a set of symbols of the one or more slots, whether that symbol is one of DL or UL.

29. The base station of claim 25, wherein the higher layer signaling further indicates a monitoring period associated with the DCI message that indicates the combination of slot formats, wherein the monitoring period indicates a number of slots of the one or more slots.

30. The base station of claim 29, wherein the higher layer signaling further indicates one or more potential slots for blind decoding of the DCI message that indicates the combination of slot formats.

31. The base station of claim 30, wherein the one or more potential slots is a single slot.

32. The base station of claim 30, wherein the processing circuitry is further configured to:
   reserve resources corresponding to the control resource set in the one or more potential slots; and
   rate match one or more of NR (Previously Presented Radio) PDSCH (Physical Downlink Shared Channel) or NR PDCCH (Physical Downlink Control Channel) around the resources corresponding to the control resource set in the one or more potential slots.

33. The base station of claim 25, wherein the at least the portion of the control resource set comprises a group common PDCCH (Physical Downlink Control Channel), wherein the group common PDCCH is CRC (Cyclic Redundancy Check)-less, wherein the processing circuitry is further configured to channel code the group common PDCCH based on Parity Check aided Polar Codes (PC-Polar Codes), and wherein the group common PDCCH has an AL (Aggregation Level) of 1 or 2.

34. The base station of claim 25, wherein the processing circuitry is further configured to facilitate randomized inter-cell interference via one or more of:
   configuring, for the control resource set, different resources than at least one cell neighboring the base station;
   configuring, for group common PDCCH (Physical Downlink Control Channel) of the control resource set, a different periodicity than the at least one cell neighboring the base station; or
   interleaving REG (Resource Element Group) bundles of the group common PDCCH based on a cell ID (Identity) of the base station and also based on applying a cell-specific frequency-domain cyclic shift to at least a starting REG bundle of the REG bundles.

* * * * *